United States Patent

[11] 3,629,490

[72] Inventor Hans Keller
Kiel, Germany

[21] Appl. No. 814,657
[22] Filed Apr. 9, 1969
[45] Patented Dec. 21, 1971
[73] Assignee Rudolf Hell Kommanditgesellschaft
Kiel, Germany
[32] Priority Apr. 18, 1968
[33] Germany
[31] P 17 72 234.8

[54] METHOD FOR ELECTRONIC COLOR CORRECTION
2 Claims, 3 Drawing Figs.

[52] U.S. Cl. .......... 178/5.2 A
[51] Int. Cl. .......... G03b 27/78
[50] Field of Search .......... 178/5.2 A; 355/38; 356/175

[56] References Cited

UNITED STATES PATENTS

| | | | |
|---|---|---|---|
| 2,993,087 | 7/1961 | Hell .......... | 355/38 |
| 3,124,036 | 3/1964 | Hell et al. .......... | 355/38 |

FOREIGN PATENTS

| | | | |
|---|---|---|---|
| 906,546 | 9/1962 | Great Britain .......... | 178/5.2 A |

*Primary Examiner*—Robert L. Griffin
*Assistant Examiner*—George G. Stellar
*Attorney*—Hill, Sherman, Meroni, Gross & Simpson

ABSTRACT: A method for the electronic color correction of an electrical signal representing a color record employing a secondary correction signal derived by difference formation from a primary color separation signal to be corrected and a primary color correction signal of the same grey gradation, wherein the secondary correction signal disappears for grey tones, and in which the color separation signal to be corrected and the signals to be used for the difference formation are transformed according to respective different preferably nonlinear functions lying between logarithmic and linear functions, with the curve of the color separation signal to be corrected more closely approaching a logarithmic function and the curve of the signals to be used for difference formation more closely approaching a linear function.

INVENTOR.
Hans Keller

BY ATTORNEYS

INVENTOR.
Hans Keller

BY Hill, Sherman, Meroni, Gross & Simpson
ATTORNEYS

METHOD FOR ELECTRONIC COLOR CORRECTION

BACKGROUND OF THE INVENTION

The present invention is directed to a method for electronic color correction in which a secondary correction signal is derived from the color separation signal to be corrected and a primary color correction signal of the same grey gradation derived from at least one other color record, by forming the difference, which secondary correction signal disappears for grey tones.

Such a color correction is necessary in the reproduction art for the production of color separation printing plates and the like. It is known to produce a color record from a color picture original by photoelectric scanning, which may be accomplished by passing the scanning light beam through a color separation filter of a color complementary to that of the color record. For example, a cyan color filter for the red record, etc. In order to simultaneously obtain color records for each of the three primary colors red, yellow, and blue, the scanning beam is divided into three paths, in each one of which is disposed an appropriate color separation filter. Signals can thereby be obtained corresponding to the color measurement value of each picture dot or element.

Due to certain unavoidable deficiencies of the color filters, as well as a lack of purity of the printed colors, an identical reproduction of the exact color as the original cannot be produced from such color measurement value signals without additional processing. Consequently, the color correction referred to is effected with consideration of the effects of such errors.

Achieving an electronic color correction implies that a trio of color dosage value signals must be ascertained for each trio of color value signals obtained by photoelectrically scanning the original colored picture to be reproduced. Mathematically, this corresponds to a topological deformation of an irregular rhomboidal hexahedron into a cube. For this purpose a system of linear equations is occasionally cited as a mathematical basis, which enables a linear stereoscopic transformation to be employed as a first approximation (see U.S. Pat. No. 2,721,892). As the coordinates of the color space under consideration are density values, the primary color signal values proportional to the transparency will usually have undergone a logarithmic compression to enable calculation by means of simple addition and subtraction instead of employing multiplication and division.

It is also previously known to obtain a secondary signal containing correction information by forming a difference from the values of a logarithmically uncorrected separation signal and another logarithmic and primary signal utilized for correction, which contains only color information and therefore no grey information whereby such signal disappears for all grey values. This type of correction is also known as compensative masking.

In connection with the construction of color correction apparatus according to this principle, it was experienced that the quality of the correction was as yet not sufficiently satisfactory. The reason therefore was the fact that in the uncorrected rhomboidal color space the two opposed surfaces not only to do not extend parallel to one another but are noticeably distorted. Improvements were then undertaken which have been set forth in patent literature, which have a common characteristic that the difference signal containing no grey information is transformed into a nonlinear distorted characteristic (see British Pat. No. 855,895, corresponding to German Pat. No. 1,135,295) or one which is bent at the zero point (see British Pat. No. 1,057,370) before it is added, as a correcting signal, to the uncorrected signal. This method, at best, eliminates defects in correction which originate from the nonparallelism of the rhomboidal surfaces. This is schematically illustrated in FIG. 1 of the accompanying drawings, in which the logarithmic color separation signal is plotted as the ordinate and a suitable signal of the same grey gradation containing the correction information is plotted as the abscissa.

In the figure W and S are the white and black points respectively, with the grey line connecting them while A and K are the points of a color separation record and its complementary color. In order to lower the ordinate of A to the black value, a larger correction signal from the ordinate of A must be subtracted than that which must be added to the ordinate of K in order to obtain a white level of W. If the difference signal value is formed from both the coordinate signal values, this can be considered proportional to the distance between the grey lines and the color point with a sign change thereby occurring on the grey line. As is apparent from FIG. 1, point A represents a difference signal smaller than K but the position of A has to be more strongly corrected. In order to achieve this result, the positive difference signals must be reduced with respect to the negative signals. This alteration of the difference signal is the common characteristic of the known method above referred to. The geometric locus of the same difference, signals in FIG. 1 thus is a set of lines parallel to the grey line.

Since the uncorrected color space is in a first approximation bordered only by lines and planes, whereas in reality it has convex curves, it becomes evident that by utilization of this method the correction in the dark color tones often is too strong, and on the contrary, in the light tones it is often too weak and produces undesired effects. Thus, the black of the colored picture original to be reproduced has a color cast. Actually, this color cast can be neutralized with the aid of the black control by means of an asymmetrical black adjustment. However, as a result the processed neutral grey wedges lying symmetrically in the color space undergo, by means of the correction, an undesired strong alteration in gradation, which destroys the monotonic grey value sequence and leads to the occurrence of negative gradation sections within the positive gradation sections in the wedges.

The same applies to an even greater extent in the case where several picture originals, which have a deep color cast in the deep dark parts, are to be color corrected at the same time. An additional, more technical disadvantage is that the logarithmic formation of the signals in the subsequent gradation modulations must again often be partly cancelled, which leads to inaccuracies in the calculation. Above all, it should be particularly noted that the strong asymmetry of the color rhomboid illustrated in FIG. 1, in the case of a cyan separation, disadvantageously requires an even less color correction in the white colors and an even stronger correction in the black colors in order to reduce these deficiencies.

In order to eliminate such deficiencies, it has already been suggested as illustrated in my copending application Ser. No. 715,040, to transform the signals employed for the difference formation and the signal to be corrected in accordance with one and the same nonlinear function whose characteristic curve lies between a logarithmic and linear functions and is represented by a power function $y=x^a$ with $0.3 \leqq a \leqq 0.6$.

By means of such transformation, the condition should be reached where in the distortions of the rhomboidal color space, in particular the curve of its surface, are balanced by means of counter distortion. However, it has been ascertained that this balance is only partially successful in such previously proposed method.

The present invention is therefore directed to a further improvement to eliminate the disadvantages referred to.

BRIEF SUMMARY OF INVENTION

By means of the invention a correction such as discussed, can be considerably improved by effecting a transforming of the color separation signal to be corrected and of the signals to be used for difference formation in accordance with respective preferably nonlinear functions which are different and lie between logarithmic and linear functions with the color separation signal to be corrected more closely approaching a logarithmic function and the signal to be used for the difference formation more closely approaching a linear function.

In the event functions are selected which have relatively widely different characteristic curves, the correction will take effect predominantly in the area relatively close to the white. In extreme cases another additional correction of the darker colors may be desirable or required.

In such cases, a first secondary correction signal, especially for the light color tones and a secondary correction signal especially for the dark color tones can be derived, and, in this way the color separation signals, involved in the difference formation in the derivation of the second secondary correction signal, are transformed in accordance with a function of lesser difference than that used in the derivation of the first secondary correction signal.

BRIEF DESCRIPTION OF THE DRAWINGS

Referring to the drawings in which like reference characters indicate like or corresponding elements.

DETAILED DESCRIPTION OF THE INVENTION

Figure 1:
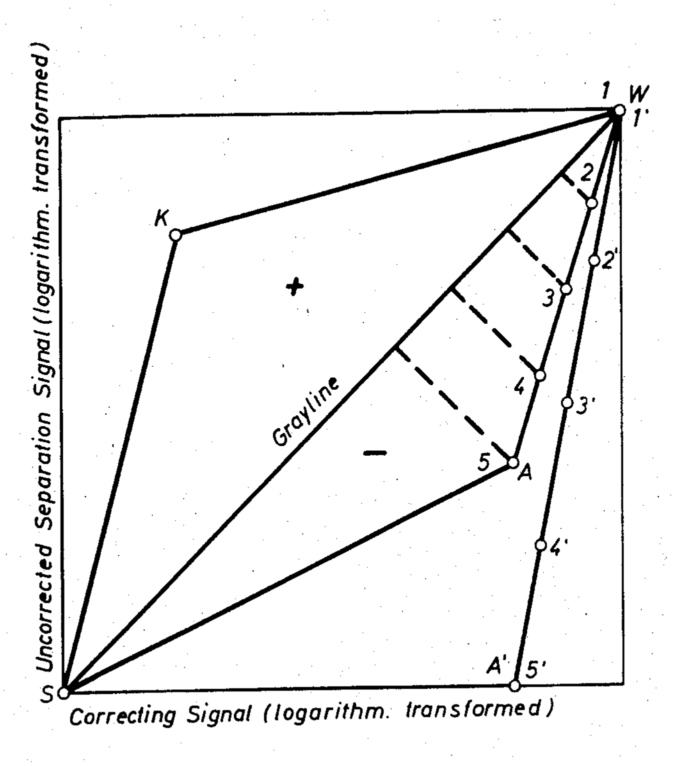
FIG. 1 represents a diagram illustrating the position of a color separation record and its complementary colors in the color plane before color correction, and as a comparison, the effect of the black color correction by logarithmic transformation of the color separation and correction color signals.

Referring to the drawings and more particularly to FIG. 1, the diagram therein illustrated represents a plane projection of the color space, which is shown as a rhomboidal surface. The corner points of such surface are the white value W and the black value S with the color spot of the separation color being positioned at A and that of its complementary color being positioned at K.

Color separation signal values are plotted as ordinate values and values of the correction signal are plotted as abscissa values, both in accordance with known logarithmic transformation. Intermediate values are marked on the color line W-A at equal distances 1–2, 2–3, 3–4 and 4–5. By means of a suitable correction value which is proportional to the distance of the colors 1–5 from the grey line, the color density of A is lowered in the direction towards A′ on the black color line, and this results in a color line W–A′ on which the intermediate 3′–4′ and 4′–5′, with such intermediate values however again being equally spaced.

Figure 2:
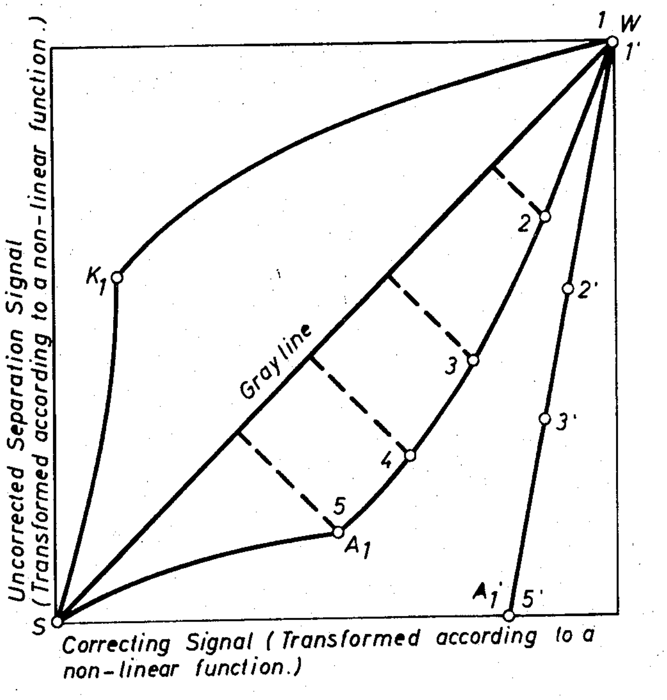
FIG. 2 presents a similar diagram illustrating the modified results occurring in a transformation of both color signals according to power functions.

By effecting transformation of the separation signals and of the correction signal according to a color function, the diagram W,S,$A_1$, $K_1$, according to FIG. 2 may be obtained. As is apparent, the distances between the color loci 1–5 are unequal and increase in a direction toward the white value $W_1$.

If the ordinate values illustrated in the diagram of FIG. 1 are corrected by the correction values of FIG. 2, the distribution of the color loci 2′–5′ on the color line W–$A_1$ will be obtained as illustrated in FIG. 2. This distribution indicates that the light colors are lowered to a greater extent than the dark colors and thus corresponds to the specific purpose of the correction, namely a stronger color concentration.

Corresponding results are likewise achieved during the white color correction.

It will be apparent from the above description that the choice of the exponents of the color functions may be varied and that by a particular selection of different exponents it is possible to vary the degree and area of the correction extensively.

Figure 3:
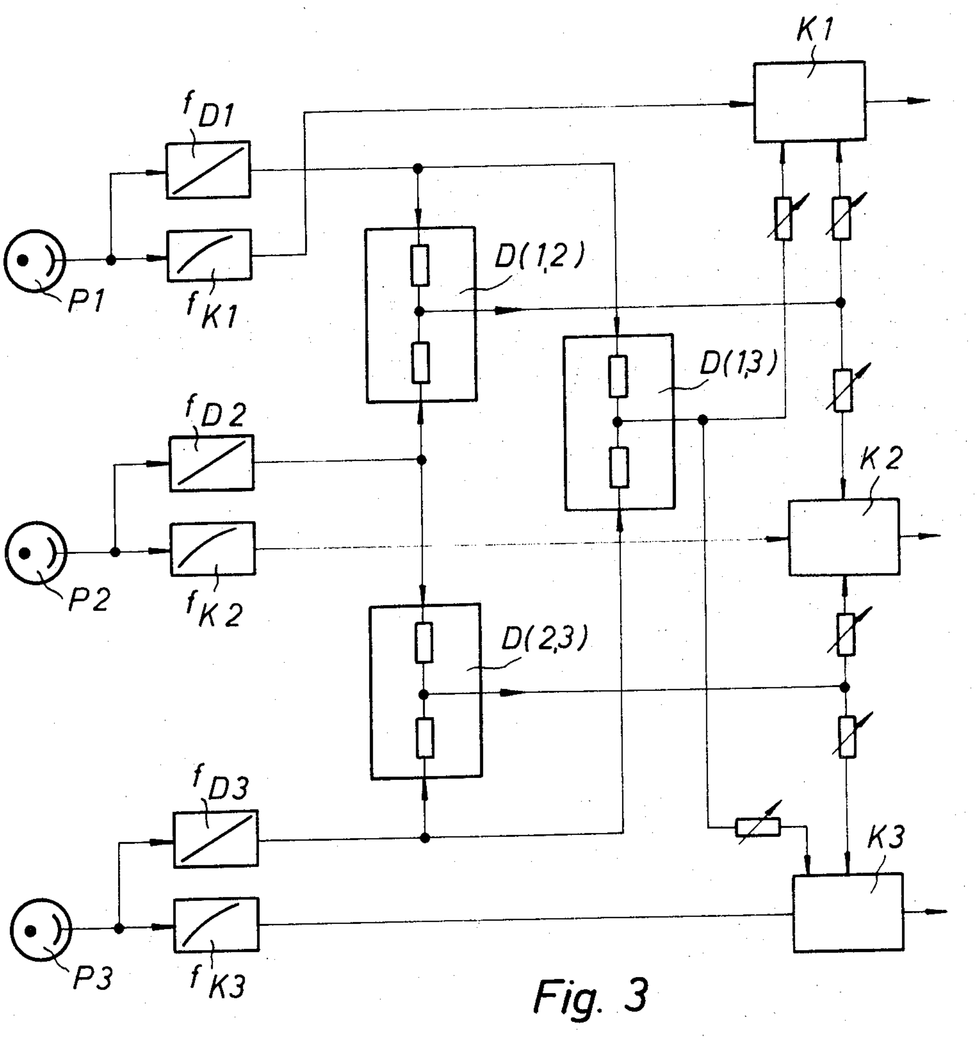
FIG. 3 illustrates a schematic diagram of a circuit suitable for carrying out the method according to the invention

An example of a circuit which may be utilized to practice the present invention is illustrated in the diagram of FIG. 3 in which three photoelectric cells P1, P2, and P3 are utilized to effect a transformation of the color separation signals into electrical signals. The output signals of each photocell are conducted to respective pairs of function transformers $f_d$ and $f_k$, in which the respective transformer $f$D1, $f$D2 and $f$D3 have like characteristics, and in like manner the transformers $f_{k1}$, $f_{k2}$, and $f_{k3}$ are of like construction and characteristics with the characteristics of the transformers $f_d$ more closely approaching a linear function while the characteristics of the transformers $f_k$ more closely approach a logarithmic function.

Due to the similarity of the characteristics referred to with respect to the transformers $f_{D1}$, $f_{D2}$ and $f_{D3}$, it is possible to eliminate the grey values which still remain in their output signals by conducting the output signals of respective pairs of such transformers to respective difference forming circuits D (1,2), D (2,3) and D (1,3). The difference voltages thus obtained at the respective difference forming circuits comprise the correction signals which disappear for the grey tones. The output voltages of the transformers $f_{K1}$, $f_{K2}$ an $f_{K3}$ are conducted to the respective correction stages K1, K2, and K3 as the signals which are to be corrected.

It will be apparent from a reference to FIG. 3 that the correction signals, in the form of the output voltages of the respective difference forming circuits, employed with each one of the correction stages are always the two correction signals whose difference formation involves the color separation signal of the same color as that being corrected thereby. In other words, assuming that the photo cell P1 is responsive to red, the cell P2 to blue and the cell P3 to yellow, the red corrections stage K1 would be responsive to the correction signals from the difference forming circuits D (1,2) and D (1,3), i.e., the red-blue signal and the red-yellow signal. In like manner, the correction stage K2 would be responsive to the red-blue correction signal and the blue-yellow correction signal while the correction stage K3 is responsive to the yellow-red correction signal and the yellow-blue correction signal.

It will be apparent from the above disclosure that the present invention enables a highly efficient correction by a relatively quite simple method which may be readily practiced with relatively simple circuits.

Having thus described my invention it will be obvious that various immaterial modifications may be made in the same without departing from the spirit of my invention.

What we claim is:

1. A method for electronic color correction in the production of colored reproductions of colored originals, by the use of respective electrical primary color separation signals, in which a secondary correction signal, which disappears for gray tones, is formed from an uncorrected primary color separation signal; and another signal of the same gray contrast containing color correction information, by forming the difference, comprising the steps of transforming the respective primary color separation signals concerned, which are proportional to the respective colors of the colored original, and the signals to be used for the difference formations according to respective, different, preferably nonlinear functions lying between a linear and a logarithmic function, effecting transformation of the respective primary color separation signals according to functions more closely approaching a logarithmic function, effecting transformation of the respective signals to be used for the difference formations according to functions more closely approaching a linear function, combining a selected pair of said last-mentioned signals to produce a secondary correction signal, and combining a transformed primary color separation signal with at least one such secondary correction signal.

2. A method according to claim 1, comprising deriving a first secondary correction signal predominantly for the light color tones and a second secondary signal predominantly for the dark color tones, and transforming the color separation signals participating in the difference formation for deriving the second secondary correction signal according to functions with less difference than those employed in deriving the first secondary correction signal.

* * * * *